Aug. 5, 1930.  W. L. RICKARD  1,772,323
MILK MIXER
Filed Nov. 22, 1929
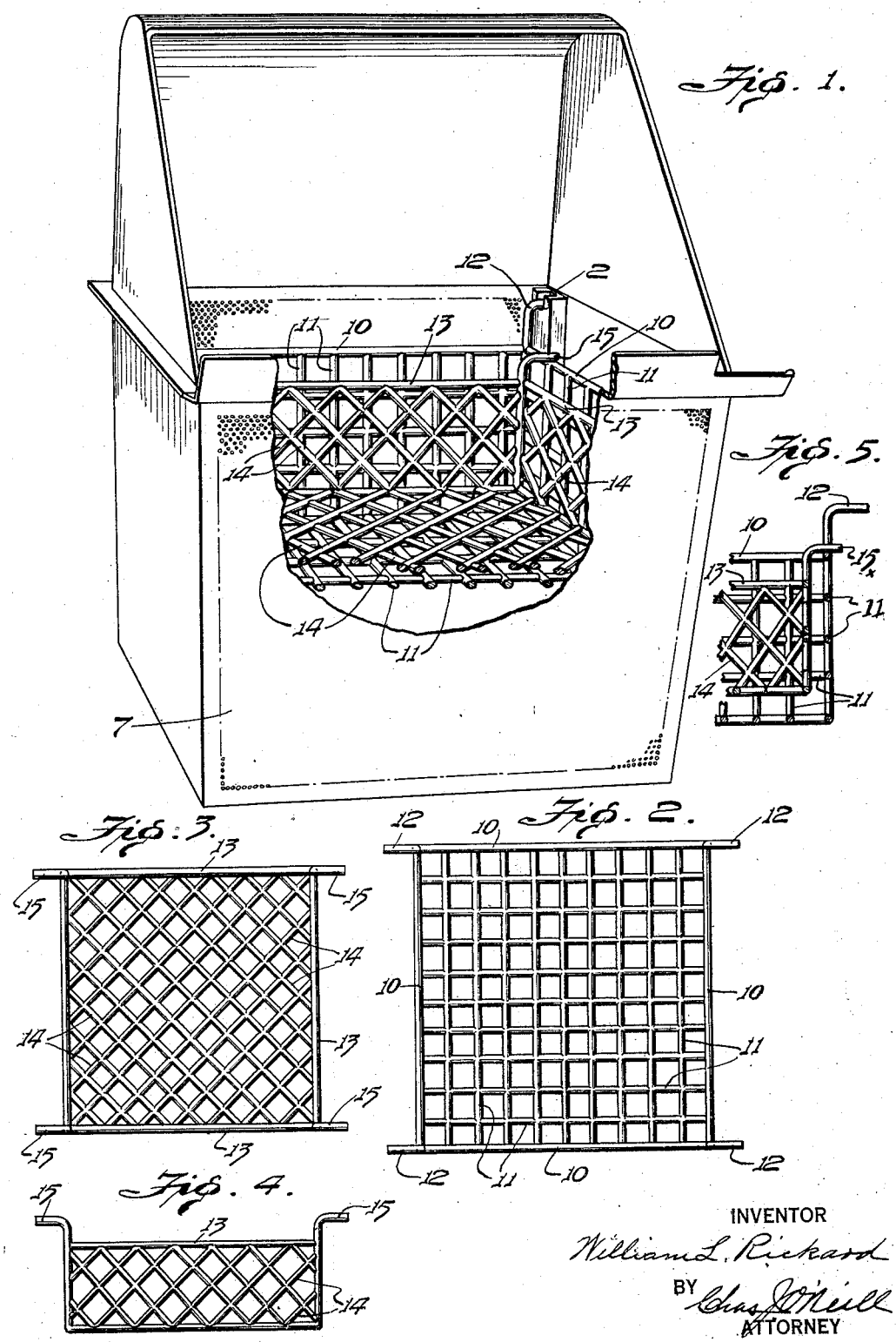
INVENTOR
William L. Rickard
BY
Chas. O'Neill
ATTORNEY Patented Aug. 5, 1930

1,772,323

UNITED STATES PATENT OFFICE

WILLIAM L. RICKARD, OF WASHINGTON, DISTRICT OF COLUMBIA

MILK MIXER

Application filed November 22, 1929. Serial No. 409,177.

The invention relates to a simple and efficient mechanism for effecting the substantially uniform admixture of the ingredients of milk, or other fluids including elements which tend to separate, the apparatus comprising a plurality of sets of impact surfaces, each set comprising a meshwork or multiplicity of intersecting bars separated by interspaces, the sets being superposed and spaced apart, the bars or meshwork of one set being disposed in crisscross relation with those of the adjacent set, so that, when the milk or other liquid is poured onto the upper impact surface, the liquid is broken up into a multiplicity of streams which are diverted by the bars into engagement with the bars of the next succeeding meshwork, so that, when even as few as two of the meshwork impact surfaces are employed, a thoroughly uniform admixture of the ingredients of the milk or other liquid will be effected.

The invention is illustrated in the accompanying drawings, in which:—

Fig. 1 is a perspective of the apparatus as applied to a milk strainer.

Fig. 2 is a plan view of the outer meshwork or impact member.

Fig. 3 is a similar view of the inner impact member.

Fig. 4 is a vertical elevation of the member shown in Fig. 3.

Fig. 5 is a fragmentary sectional elevation of the two impact members in assembled relation.

In its preferred form, the apparatus is employed in conjunction with either the strainers or the weigh cans into which the milk is poured in bulk, as it is received from the source of supply, and, as stated, the purpose of the invention is to effect a thorough admixing of the ingredients of the milk, so as to obtain a uniform distribution of said ingredients, thereby enabling typical and correct samples of the milk to be taken either immediately after the straining operation or after the weighing of the milk. In the particular embodiment of the invention illustrated, the mixing apparatus is associated with a standard strainer, such as commonly employed in dairies and into which the milk is dumped in bulk. As illustrated, the strainer comprises a generally basket-shaped receptacle 1 having foraminated sides and bottom, which are usually formed of perforated metal plates brazed or soldered to the supporting framework. In the upper portions of the corners of the strainer are secured recessed blocks 2, which serve as supports for the mixing device. Said mixing device comprises two sets of spaced impact surfaces, preferably in the form of nested basket-like elements formed of intersecting bars or meshwork so disposed that the bars of one of the elements are disposed at an angle to the bars of the other element. As shown, the outer basket-like receptacle comprises a frame 10 made up of bars of metal, preferably round or half round in cross section and the sides and bottom are composed of a meshwork or series of intersecting bars 11, which are disposed substantially normal or at right angles to the edges of the framework 10. The corner posts of the side members of the framework are extended and bent into hooklike form, as at 12, to engage the socketed lugs or brackets 2 carried by the strainer, so that the basket-like member will be suspended within the strainer. Cooperating with the outer basket-like member is an inner member of the same general construction, but smaller in its dimensions and differing in the character of the meshwork forming the sides and bottom. Said inner member comprises a frame 13 formed of metal bars with the sides and bottom of the basket-like member formed of a meshwork 14 of intersecting bars, which, however, instead of being disposed normal to the edges of the basket, are diagonal or inclined with respect thereto, so that the resultant meshwork is of the diamond type and the several bars of the inner basket-like member are disposed at angles of substantially 45° to the corresponding bars in the adjacent sections of the outer basket-like receptacle. The inner member or receptacle is of smaller dimensions than the outer receptacle or basket-like member, so that the two are separated from each other on all sides. The corner posts of the inner basket-like member are extended and bent into hooks 15, which engage the upper members of the frame 10 of the outer basket-like member, so that the inner member is held in spaced relation within the outer member, as particularly illustrated in Figs. 1 and 5.

When the two members of the mixing device are assembled within the strainer, in the relation shown in Figs. 1 and 5, and the milk is dumped in bulk into the strainer from the cans in which it is shipped, it will be seen that the relatively heavy body of milk pouring out of the can falls and impacts the bars of the inner basket-like member with considerable force, so that the mass of milk is broken up into small streams which flow between the bars or meshwork, the round surfaces of the bars serving to deflect the streams laterally in all directions, so that the streams meet and commingle, thereby tending to distribute the ingredients of the milk uniformly throughout the mass. After passing through the first grid-like impact device, the body of milk encounters the next subjacent grid-like impact surface, where it is again broken up into various streams and diverted in different directions from the original lines of diversion by reason of the diagonal or diamond mesh of the grid formation of the lower impact member, the ultimate result being that the entire body of milk, after passing through the two grid-like impact devices, will be found to be substantially uniform in its consistency, that is to say, all of the ingredients, both liquid and solid, will be uniformly distributed throughout the body and a sample taken at random will contain the proper proportions of the various ingredients.

It will be noted that the two elements of the mixing device are separatable, so that they may be removed and replaced with facility and lend themselves to ready cleansing and sterilization. While the two elements of the impact mixer have been illustrated as substantially basket shaped, it will be understood that the invention is not limited to this particular form, but the shape and mode of constructing the individual elements may be changed to meet the varying conditions of use, the one necessary condition to be observed is that the grid-like elements be spaced or separated from each other and that the bars of the respective elements be arranged in different angular relation, preferably crisscross with respect to each other, for the purpose hereinbefore set forth.

As indicated, the preferred from of the device is that of the nested and separated basket-like members of meshwork, which is especially well adapted for the mixing of relatively large volumes of milk or the like, which are delivered to the mixer in heavy streams from the containers, in which case the milk passes not only through the bottoms of the members, but also through the meshwork sides, in which the crisscross meshwork effects the uniform mixture or distribution of the ingredients of the milk. Should the grids or meshwork be made flat, it is deemed necessary to make them of a size to fit the interior of the receiving vessel, as otherwise portions of the milk would flow down the side walls of the vessel, without any proper mixing operation, so that the whole body of milk would be mixed only in part and samples taken therefrom would not give a proper indication of the butter fat content. The flat grids or meshwork sections, which accurately fit within the container and are spaced apart vertically, may be effective in uniformly mixing relatively small volumes of milk or similar liquids, and, when so constructed, the individual elements are separately removable from the vessel or container to permit cleansing and sterilization, as in the case of the basket-like members.

What I claim is:

1. A device for effecting a substantially uniform admixture of the ingredients of milk or the like, comprising a plurality of sets of impact surfaces, each set comprising a multiplicity of intersecting bars separated by interspaces, the sets being arranged in superposed spaced relation.

2. A device for effecting a substantially uniform admixture of the ingredients of milk or the like, comprising a plurality of sets of impact surfaces, each set comprising a multiplicity of intersecting bars separated by interspaces, the sets being arranged in superposed spaced relation and the bars of the respective sets being crisscrossed.

3. A device for effecting a substantlly uniform admixture of the ingredients of milk or the like, comprising a plurality of sets of impact surfaces, each set comprising a multiplicity of intersecting bars separated by interspaces and having deflecting top surfaces. the sets being arranged in superposed spaced relation.

4. A device for effecting a substantially uniform admixture of the ingredients of milk or the like, comprising superposed spaced meshworks of bars having deflecting top surfaces. the bars of each meshwork being disposed angularly with respect to the bars of the adjacent meshwork.

5. A device for effecting a substantially uniform admixture of the ingredients of milk or the like, comprising nested and separated basket-like members of meshwork with the meshes of one member crisscrossing the meshes of the adjacent member.

6. A device for effecting a substantially uniform admixture of the ingredients of milk or the like, comprising an outer basket-like member of rigid meshwork having means for suspending the member, and an inner member similarly shaped and of smaller dimensions suspended within the outer member formed of meshwork diagonally disposed with respect to the meshwork of the outer member.

7. A device for effecting a substantially uniform admixture of the ingredients of milk or the like, comprising an outer basket-like member of rigid meshwork having suspension hooks at its corners, and an inner member of similar shape and smaller dimensions having hooks on its corners to engage the rim of the outer member and suspend the inner member in spaced relation within the outer member, the meshwork of the respective members being disposed in criss-cross relation.

In testimony whereof, I affix my signature.

WILLIAM L. RICKARD.